United States Patent
Shirai et al.

(10) Patent No.: US 10,591,051 B2
(45) Date of Patent: Mar. 17, 2020

(54) SENSOR MOUNTING STRUCTURE

(71) Applicant: NIDEC TOSOK CORPORATION, Zama, Kanagawa (JP)

(72) Inventors: Hiroshi Shirai, Zama (JP); Tomoka Osawa, Zama (JP); Toshiaki Nakamura, Zama (JP); Kenichi Ozawa, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/038,574

(22) Filed: Jul. 18, 2018

(65) Prior Publication Data

US 2019/0024782 A1    Jan. 24, 2019

(30) Foreign Application Priority Data

Jul. 21, 2017 (JP) ................. 2017-141650

(51) Int. Cl.
| | |
|---|---|
| F16H 61/00 | (2006.01) |
| F16K 1/08 | (2006.01) |
| F15B 13/08 | (2006.01) |
| F16K 27/00 | (2006.01) |
| F16K 37/00 | (2006.01) |

(52) U.S. Cl.
CPC ....... *F16H 61/0009* (2013.01); *F15B 13/086* (2013.01); *F16K 1/08* (2013.01); *F16K 27/00* (2013.01); *F16K 37/005* (2013.01)

(58) Field of Classification Search
CPC ...... F16H 61/0009; F15B 13/086; F16K 1/08; F16K 27/00; F16K 37/005
See application file for complete search history.

(56) References Cited

U.S. PATENT DOCUMENTS

| | | | | |
|---|---|---|---|---|
| 2005/0193809 A1* | 9/2005 | Matsumura | ......... | G01L 19/0007 73/114.38 |
| 2006/0272426 A1* | 12/2006 | Jarrell | ....................... | G01F 1/58 73/861.12 |
| 2019/0024782 A1* | 1/2019 | Shirai | ................. | F16H 61/0009 |

FOREIGN PATENT DOCUMENTS

| | | | | |
|---|---|---|---|---|
| DE | 10043448 A1 * | 4/2002 | ......... | F16H 61/0009 |
| JP | 2001271918 A | 10/2001 | | |
| JP | 2004177223 A | 6/2004 | | |
| JP | 2010174991 A | 8/2010 | | |
| JP | 2014516141 A | 7/2014 | | |

* cited by examiner

*Primary Examiner* — Vicky A Johnson (74) *Attorney, Agent, or Firm* — Cantor Colburn LLP (57) ABSTRACT

A sensor mounting may include an accommodation unit; a sensor case; and a screw member. A flow passage body may include the accommodation unit, and a flow passage opening. The fluid pressure sensor may include a sensor main body, and the sensor case. The sensor case may include a sensing hole. The sensor case may include a columnar portion disposed along a center axis, and a flange portion which protrudes from the columnar portion. The accommodation unit may include a female screw provided in a radially inside surface of the accommodation unit. The screw member may include the screw member may include a hole portion, and a male screw. The screw member may be disposed to be opposed to an upper side of the flange portion.

8 Claims, 6 Drawing Sheets

SENSOR MOUNTING STRUCTURE

CROSS REFERENCE TO RELATED APPLICATION

The present invention claims priority under 35 U.S.C. § 119 to Japanese Application No. 2017-141650 filed Jul. 21, 2017, the entire content of which is incorporated herein by reference.

FIELD OF THE INVENTION

At least an embodiment of the invention relates to a sensor mounting structure.

BACKGROUND

A fluid pressure sensor that measures the pressure of a fluid is known. As a fluid pressure sensor, a hydraulic sensor mounted on a control valve, in which an oil passage is provided, is described in Japanese Unexamined Patent Application Publication No. 2010-174991.

For example, in Japanese Unexamined Patent Application Publication No. 2010-174991, a method of mounting a hydraulic sensor on a control valve is described.

As such a method of mounting a hydraulic sensor on a control valve, there is a method of mounting a hydraulic sensor from the outside of a control valve. As such as method, a method of preparing a separate bracket to fix a hydraulic sensor to a control valve, or a method of providing a male screw in a hydraulic sensor to tighten the male screw of the hydraulic sensor from the outside of the control valve into a female screw hole provided in the control valve can be given as an example.

Since a high-pressure force is exerted from oil, which is a measuring target, on a hydraulic sensor of a hydraulic control device, it is necessary to make the mounting strength of the hydraulic sensor on the control valve sufficiently high. Accordingly, for example, in a case where the method of tightening the male screw of the hydraulic sensor into the female screw hole of the control valve is used out of the methods described above, it is necessary to make a length at which the screws mesh with each other sufficiently large, and thus the hydraulic sensor is likely to increase in size. Therefore, in order to secure sufficient mounting strength of the hydraulic sensor, the hydraulic sensor increases in size. Thus, a problem of an increase of the entire hydraulic control device in size arises.

In view of the circumstances, at least an embodiment provides a sensor mounting structure that can prevent an entire fluid pressure control device from increasing in size while securing the mounting strength of a fluid pressure sensor.

SUMMARY

According to at least an embodiment, there is provided a sensor mounting structure that allows a fluid pressure sensor measuring a pressure of a fluid flowing in a flow passage to be mounted on a flow passage body having the flow passage, in which the fluid flows, therein. The flow passage body has an accommodation unit, which is open to an upper side of the flow passage body and accommodates at least a part of the fluid pressure sensor therein, and a flow passage opening which is exposed to an inside of the accommodation unit and is connected to the flow passage. The fluid pressure sensor has a sensor main body and a sensor case which covers the sensor main body. The sensor case has a sensing hole, which is connected to the flow passage opening in a state where the fluid pressure sensor is mounted on the flow passage body, in a lower surface of the sensor case. The sensor mounting structure includes the accommodation unit, the sensor case, and a screw member that fixes the sensor case to the flow passage body. The sensor case has a columnar portion disposed along a center axis extending in an up-and-down direction, and a flange portion which protrudes from the columnar portion to a radially outside and is accommodated in the accommodation unit. The accommodation unit has a female screw provided in a radially inside surface of the accommodation unit. The screw member has a hole portion, which is recessed from a lower end portion of the screw member in an upward direction and into which at least a part of the columnar portion is inserted, and a male screw which is provided in a radially outside surface of the screw member and is screwed into the female screw. The screw member is disposed to be opposed to an upper side of the flange portion.

The above and other elements, features, steps, characteristics and advantages of at least an embodiment of the present invention will become more apparent from the following detailed description of at least an embodiment with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A Z-axis direction in each drawing is an up-and-down direction Z of which a positive side is an upper side and a negative side is a lower side.

A center axis J appropriately illustrated in each drawing extends in the up-and-down direction Z. A radial direction of which the center is the center axis J will be simply referred to as a "radial direction" and a circumferential direction of which the center is the center axis J will be simply referred to as a "circumferential direction". The up-and-down direction, the upper side, and the lower side are merely terms for describing relative position relationships among respective units, and actual disposition relationships may be disposition relationships other than the disposition relationships expressed by the terms.

Description of Embodiment 1

Figure 1:
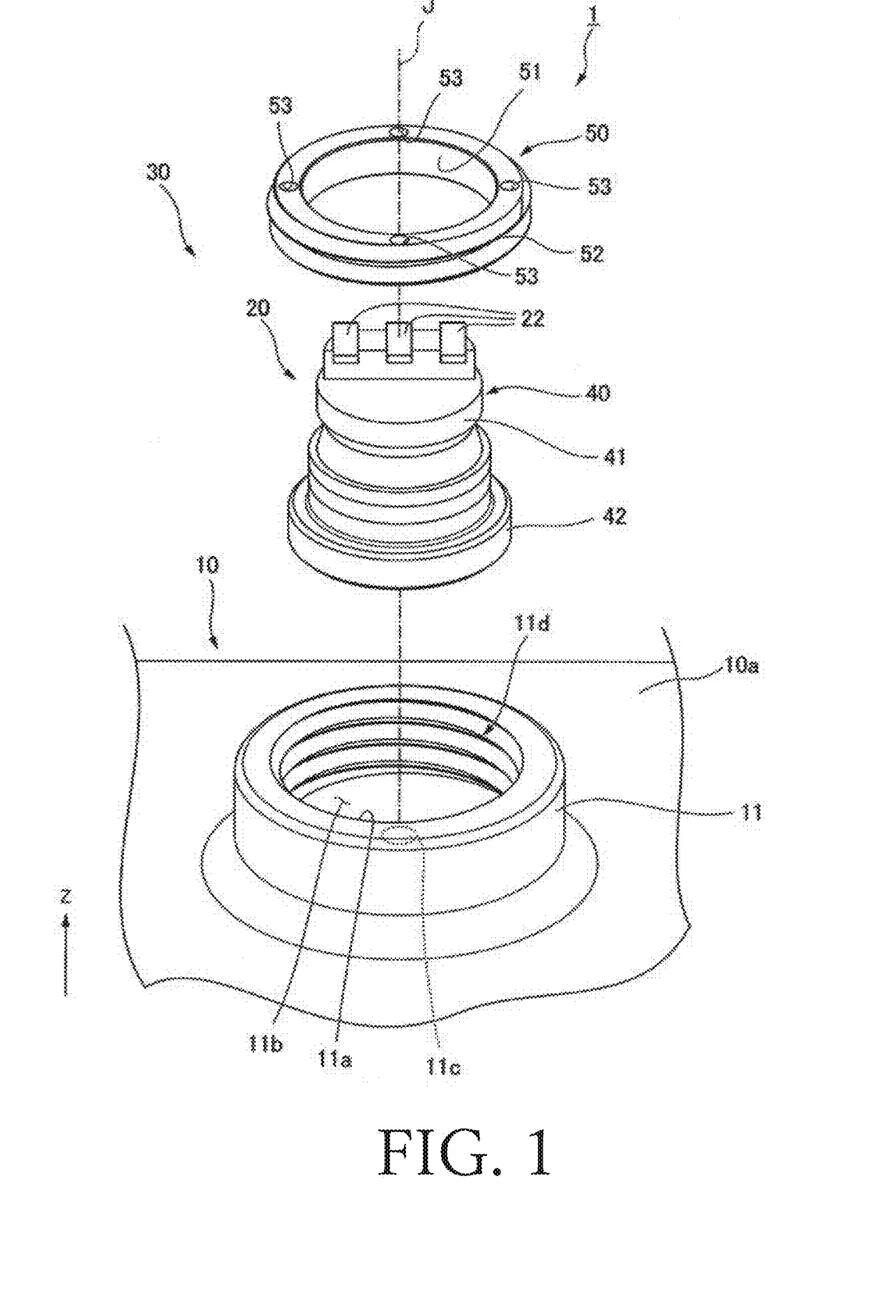
FIG. 1 is a perspective view illustrating a sensor mounting structure of Embodiment 1.
Figure 2:
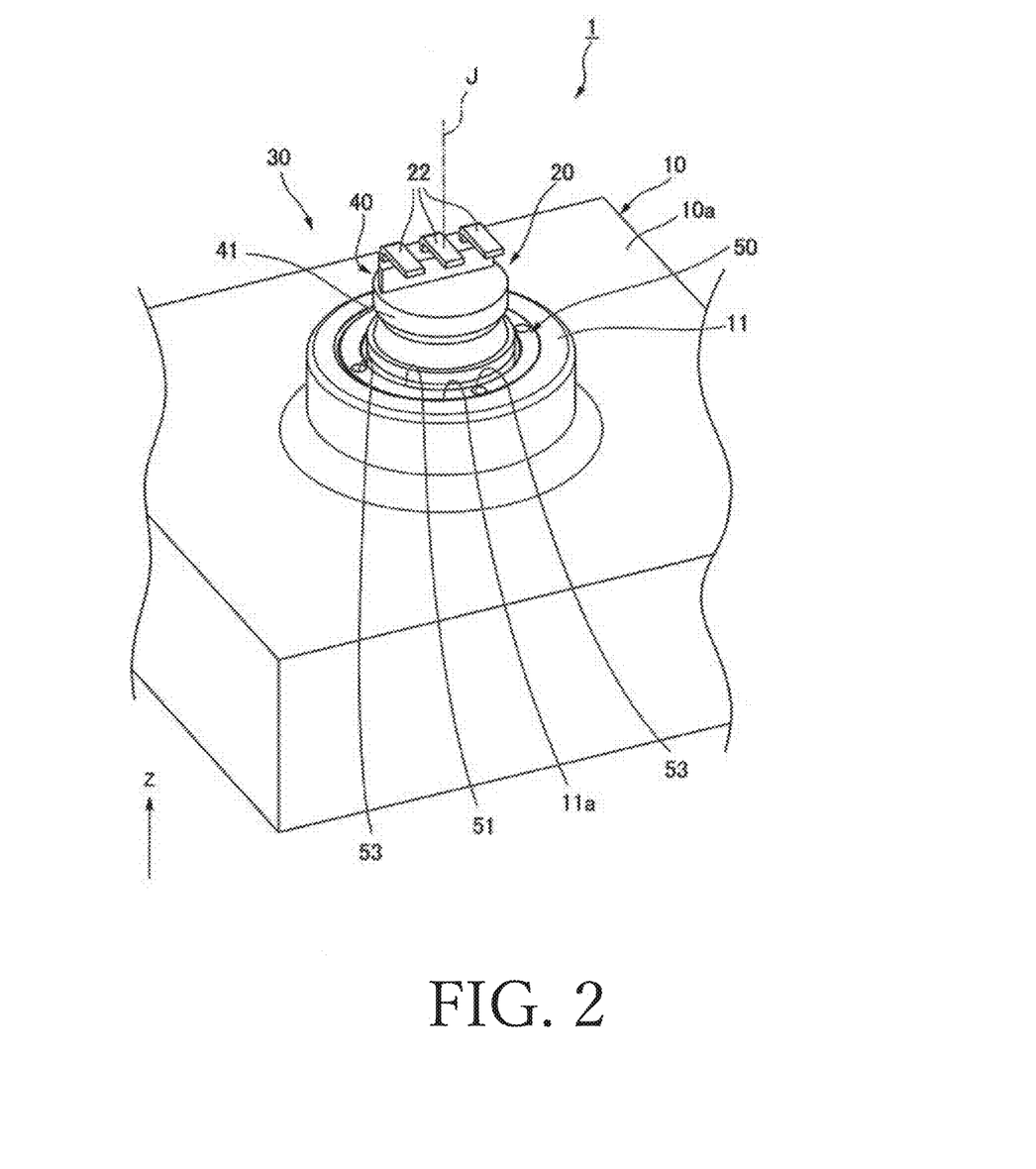
FIG. 2 is a perspective view illustrating the sensor mounting structure of Embodiment 1.
Figure 3:
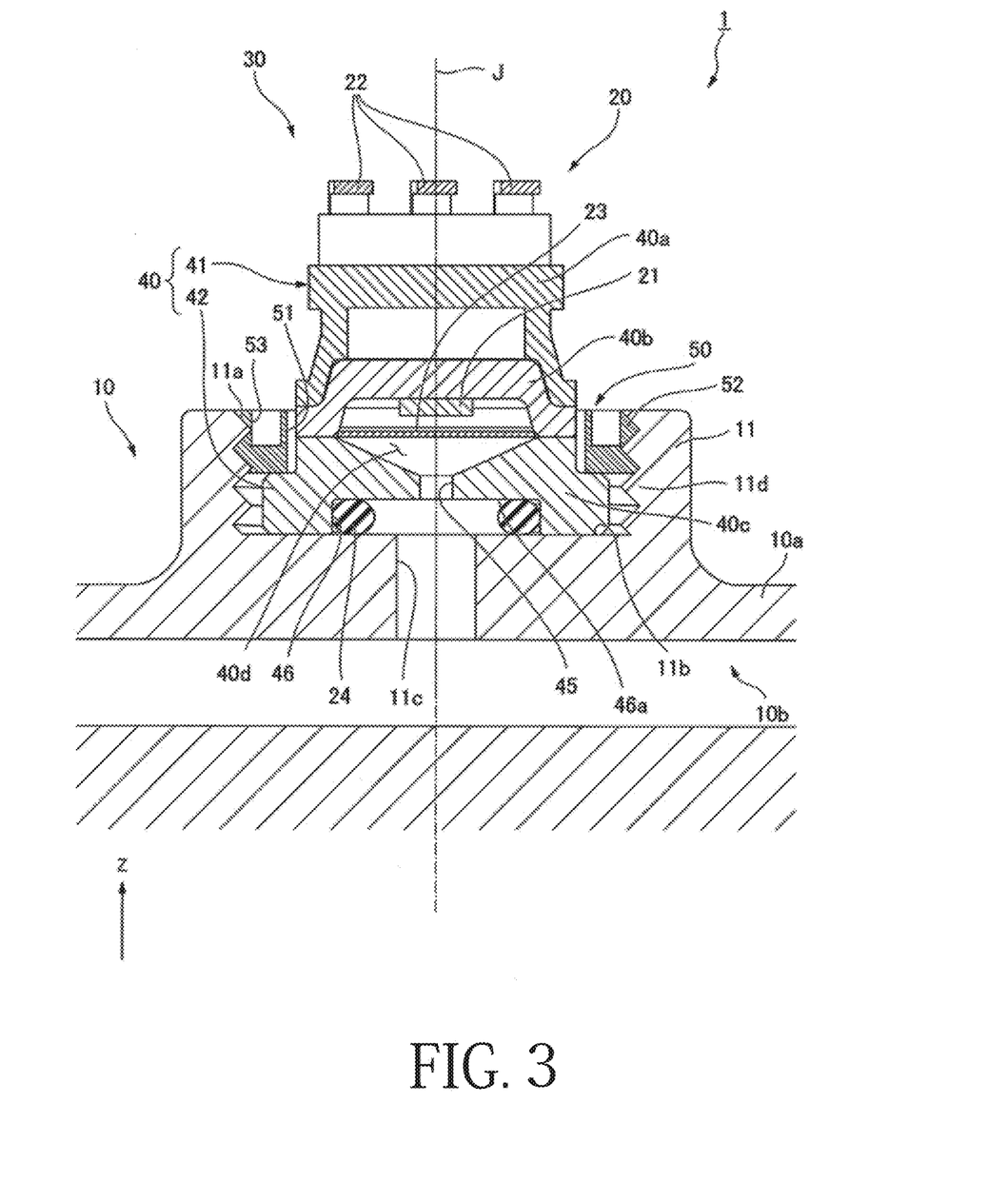
FIG. 3 is a sectional view illustrating the sensor mounting structure of Embodiment 1.

A sensor mounting structure 30 of the embodiment illustrated in FIG. 1 to FIG. 3 allows a fluid pressure sensor 20 to be mounted on a flow passage body 10 of a control valve in a fluid pressure control device 1. FIG. 1 illustrates a state before the fluid pressure sensor 20 is mounted on the flow passage body 10. FIG. 2 and FIG. 3 each illustrate a state where the fluid pressure sensor 20 is mounted on the flow passage body 10 by means of the sensor mounting structure 30.

The state in which the fluid pressure sensor 20 is mounted on the flow passage body 10 by means of the sensor mounting structure 30 will be referred to as a "mounted state". In the following description, relative position relationships among respective units are set as position relationships in the mounted state unless otherwise indicated.

As illustrated in FIG. 3, the sensor mounting structure 30 includes an accommodation unit 11 of the flow passage body 10, a sensor case 40 of the fluid pressure sensor 20, a seal member 24, and a screw member 50. The flow passage body 10 has a flow passage 10b, in which a fluid flows, therein. The fluid is, for example, oil. The fluid pressure sensor 20 measures the pressure of the fluid flowing in the flow passage 10b. The fluid pressure sensor 20 is, for example, a hydraulic sensor measuring an oil pressure. The flow passage body 10 has a flow passage body main body 10a, in which the flow passage 10b is provided, and the accommodation unit 11.

As illustrated in FIG. 1, the accommodation unit 11 has a tubular shape protruding from an upper surface of the flow passage body main body 10a in an upward direction. More specifically, the accommodation unit 11 has a cylindrical shape of which the center is the center axis J extending in the up-and-down direction Z. The accommodation unit 11 is open to an upper side of the flow passage body 10. At least a part of the fluid pressure sensor 20 is accommodated inside the accommodation unit 11.

A flow passage opening 11c is provided in a bottom surface 11b of the accommodation unit 11. That is, the flow passage body 10 has the flow passage opening 11c. The bottom surface 11b is a surface facing the upward direction, out of inside surfaces of the accommodation unit 11. The bottom surface 11b is orthogonal to the up-and-down direction Z. The flow passage opening 11c is exposed to the inside of the accommodation unit 11. The flow passage opening 11c of the embodiment has a circular shape of which the center is the center axis J. As illustrated in FIG. 3, the flow passage opening 11c is connected to the flow passage 10b. The accommodation unit 11 has a female screw 11d provided in a radially inside surface 11a of the accommodation unit 11. The female screw 11d of the embodiment is provided in the entire radially inside surface 11a.

The fluid pressure sensor 20 has the sensor case 40, a sensor main body 21, a diaphragm 23, and connection terminals 22. The sensor case 40 covers the sensor main body 21. The sensor case 40 of the embodiment is provided on the bottom surface 11b of the accommodation unit 11. The sensor case 40 has a columnar portion 41 and a flange portion 42.

The columnar portion 41 is disposed along the center axis J extending in the up-and-down direction Z. As illustrated in FIG. 1, the columnar portion 41 of the embodiment has a cylindrical shape. As illustrated in FIG. 3, a lower surface of the columnar portion 41 is a part of the lower surface of the sensor case 40. The columnar portion 41 has an accommodating recessed portion 46 which is recessed in the upward direction from a lower surface of the columnar portion 41, that is, the lower surface of the sensor case 40. A shape seen from a lower side of the accommodating recessed portion 46 of the embodiment is a circular shape of which the center is the center axis J.

A sensing hole 45, which is recessed in the upward direction from a top surface 46a of the accommodating recessed portion 46 and is connected to an accommodating space 40d to be described later, is provided in the middle of the accommodating recessed portion 46. The top surface 46a of the accommodating recessed portion 46 is a surface facing a downward direction. That is, the sensor case 40 has the sensing hole 45 in the lower surface of the sensor case 40. The sensing hole 45 is connected to the flow passage opening 11c in a state where the fluid pressure sensor 20 is mounted on the flow passage body 10. The inner diameter of the sensing hole 45 is smaller than the inner diameter of the flow passage opening 11c.

The flange portion 42 protrudes from the columnar portion 41 to a radially outside. The flange portion 42 of the embodiment is provided on a lower end portion of the columnar portion 41. Along with the lower surface of the columnar portion 41, a lower surface of the flange portion 42 is disposed on the same plane orthogonal to the up-and-down direction Z. The lower surface of the sensor case 40 is configured with the lower surface of the columnar portion 41 and the lower surface of the flange portion 42. The flange portion 42 has an annular shape surrounding the columnar portion 41 in the circumferential direction. The accommodation unit 11 accommodates the flange portion 42.

The outer diameter of the flange portion 42 is smaller than the inner diameter of the accommodation unit 11. For this reason, a gap in the radial direction is provided between a radially outside surface of the flange portion 42 and the radially inside surface of the accommodation unit 11.

The sensor case 40 of the embodiment is configured with three members including an upper case 40a, a lid 40b, and a lower case 40c. The upper case 40a is a portion configuring an upper portion of the columnar portion 41. The upper case 40a is, for example, a single member made of a resin. The lower case 40c is a portion configuring a lower portion of the columnar portion 41. The flange portion 42 is provided on the lower case 40c. The lower case 40c is, for example, a single member made of a metal. The lid 40b is sandwiched in the up-and-down direction Z in a state of staying in contact with the upper case 40a and the lower case 40c.

The accommodating space 40d is provided between the lower case 40c and the lid 40b in the up-and-down direction Z. The diaphragm 23 partitions the accommodating space 40d in the up-and-down direction Z. An upper end of the sensing hole 45 is open to a lower portion of the accommodating space 40d. The sensor main body 21 is provided on a lower surface of the lid 40b in an upper portion of the accommodating space 40d. The upper portion of the accommodating space 40d is filled with a pressure transmission liquid. In the mounted state, a fluid flows into the lower portion of the accommodating space 40d via the sensing hole 45 connected to the flow passage opening 11c. The pressure of the fluid flowed in the lower portion of the accommodating space 40d is exerted on the sensor main body 21 via the diaphragm 23 and the pressure transmission liquid. Accordingly, the sensor main body 21 can measure the pressure of the fluid in the flow passage 10b.

The accommodating recessed portion 46 accommodates the seal member 24. The seal member 24 of the embodiment is an O-ring. For this reason, the seal member 24 can be provided at a low cost, and thus the manufacturing costs of the fluid pressure control device 1 can be reduced. The seal member 24 seals between the flow passage body 10 and the sensor case 40. More specifically, the seal member 24 seals between a portion of the upper surface of the flow passage body 10, which is in the vicinity of the flow passage opening 11c, and the lower surface of the sensor case 40.

"The upper surface of the flow passage body" in the specification is a surface, which faces the upward direction and is exposed to the upper side of the flow passage body in a state where the fluid pressure sensor is not mounted, out of surfaces of the flow passage body 10. As illustrated in FIG. 1, the upper surface of the flow passage body 10 of the embodiment includes the upper surface of the flow passage body main body 10a, an upper end surface of the accommodation unit 11, and the bottom surface 11b of the accommodation unit 11.

The portion in the vicinity of the flow passage opening 11c of the embodiment is a part of the bottom surface 11b of the accommodation unit 11. That is, as illustrated in FIG. 3, the seal member 24 of the embodiment seals between the bottom surface 11b of the accommodation unit 11 and the lower surface of the sensor case 40. Accordingly, a fluid flowing from the flow passage opening 11c into the accommodating space 40d can be prevented from leaking from the accommodation unit 11 to the outside of the flow passage body 10. A distance between the lower surface of the sensor case 40 and the top surface 46a of the accommodating recessed portion 46 in the up-and-down direction Z is smaller than the dimension of the seal member 24, which is in a non-deformation state, in the up-and-down direction Z. The distance between the lower surface of the sensor case 40 and the top surface 46a of the accommodating recessed portion 46 in the up-and-down direction Z corresponds to the dimension of the accommodating recessed portion 46 in the up-and-down direction Z.

"The seal member is in the non-deformation state" in the specification includes, for example, a state before the seal member is mounted on the fluid pressure sensor and a state where the seal member is mounted on the fluid pressure sensor and the fluid pressure sensor is not mounted on the flow passage body. That is, the dimension of the seal member 24 in the non-deformation state in the up-and-down direction Z includes the dimension of the seal member 24, which is in a state where the seal member 24 is fitted into the accommodating recessed portion 46 and is mounted on the fluid pressure sensor 20, in the up-and-down direction Z before the fluid pressure sensor 20 is mounted on the flow passage body 10.

In a state where the seal member 24 is fitted into the accommodating recessed portion 46 before the fluid pressure sensor 20 is mounted on the flow passage body 10, the seal member 24 protrudes in the downward direction further than the lower surface of the sensor case 40 does. For this reason, in the mounted state, the seal member 24 is sandwiched in the up-and-down direction Z in a state where the seal member 24, which is in contact with the bottom surface 11b, is in contact with the bottom surface 11b of the accommodation unit 11 and the top surface 46a of the accommodating recessed portion 46, and is elastically compressed and deformed in the up-and-down direction Z.

The connection terminals 22 are disposed on an upper end portion of the sensor case 40. More specifically, the connection terminals 22 are disposed on the upper end portion of the columnar portion 41. The plurality of connection terminals 22 are provided in the embodiment. In FIG. 3, for example, three connection terminals 22 are provided. Although illustration thereof is omitted, the connection terminals 22 are electrically connected to the sensor main body 21. The connection terminals 22 are exposed to the outside of the sensor case 40. For this reason, it is easy to connect a power supply or the like to the fluid pressure sensor 20 via the connection terminals 22.

The screw member 50 is a member that fixes the sensor case 40 to the flow passage body 10. As illustrated in FIG. 1, the screw member 50 has an annular shape of which the center is the center axis J. The screw member 50 has a hole portion 51 recessed from a lower end portion of the screw member 50 in the upward direction. The hole portion 51 passes through the screw member 50 in the up-and-down direction Z with the center axis J as a center.

As illustrated in FIG. 3, at least a part of the columnar portion 41 is inserted into the hole portion 51. In the embodiment, the columnar portion 41 passes through the hole portion 51 and protrudes above the screw member 50. For this reason, in a case where the connection terminals 22 are provided on the upper end portion of the columnar portion 41 as in the embodiment, the connection terminals 22 can be exposed to the upper side of the flow passage body 10 even when the sensor case 40 is fixed by the screw member 50. Accordingly, it is easy to connect a power supply or the like to the fluid pressure sensor 20 via the connection terminals 22.

The inner diameter of the hole portion 51 is larger than the outer diameter of the columnar portion 41, and is smaller than the outer diameter of the flange portion 42. A gap in the radial direction is provided between a radially inside surface of the hole portion 51 and a radially outside surface of the columnar portion 41. A difference between the inner diameter of the hole portion 51 and the outer diameter of the columnar portion 41 is smaller than a difference between the outer diameter of the flange portion 42 and the inner diameter of the accommodation unit 11. For this reason, even in a case where the fluid pressure sensor 20 has moved in the radial direction by the amount of the gap between the radially inside surface of the hole portion 51 and the radially outside surface of the columnar portion 41, the flange portion 42 can be prevented from coming into contact with the radially inside surface 11a of the accommodation unit 11. Accordingly, the flange portion 42 can be prevented from coming into contact with the female screw 11d.

The screw member 50 has a male screw 52. The male screw 52 is provided in a radially outside surface of the screw member 50. As illustrated in FIG. 1, the male screw 52 of the embodiment is provided in the entire radially outside surface of the screw member 50. As illustrated in FIG. 3, the male screw 52 is screwed into the female screw 11d. The male screw 52 is disposed so as to be opposed to an upper side of the flange portion 42. In the embodiment, a lower surface of the male screw 52 comes into contact with an upper surface of the flange portion 42. The lower surface of the male screw 52 is orthogonal to the up-and-down direction Z. An upper surface of the male screw 52 and the upper end surface of the accommodation unit 11 are disposed on the same plane orthogonal to the up-and-down direction Z.

The screw member 50 is located on a radially outside of the sensor main body 21 and the diaphragm 23. That is, the screw member 50 overlaps the sensor main body 21 and the diaphragm 23 when seen in the radial direction. The screw member 50 has jig insertion holes 53 recessed from an upper surface of the screw member 50 in the downward direction. The jig insertion holes 53 are holes each of which has a bottom portion on the lower side and is open to the upper side. As illustrated in FIG. 1, the shape of each of the jig insertion holes 53 seen from the upper side is a circular shape. The plurality of jig insertion holes 53 are provided. In FIG. 1, four jig insertion holes 53 are provided. The four jig insertion holes 53 are disposed at equal intervals over the entire circumference in the circumferential direction.

First, a mounter inserts the flange portion 42 into the accommodation unit 11, and provides the fluid pressure sensor 20 on the bottom surface 11b of the accommodation unit 11. Next, the mounter brings the screw member 50 to the fluid pressure sensor 20 from an upper side thereof, and passes the columnar portion 41 through the hole portion 51. The mounter screws the screw member 50 into the inside of the accommodation unit 11, that is, the female screw 11d. At this time, the mounter rotates the screw member 50 about the center axis J, for example, by using a jig having a plurality of insertion portions to be inserted into the plurality of jig insertion holes 53, to screw the screw member 50 into the female screw 11d. The mounter screws the screw member 50 into the female screw 11d until a lower surface of the screw member 50 comes into contact with the upper surface of the flange portion 42. As described above, the fluid pressure sensor 20 is mounted on the flow passage body 10 by means of the sensor mounting structure 30.

According to the embodiment, the flange portion 42 is inserted into the accommodation unit 11, and at least a part of the columnar portion 41 is inserted into the hole portion 51. For this reason, the radially inside surface 11a of the accommodation unit 11 or the radially inside surface of the hole portion 51 can prevent the fluid pressure sensor 20 from moving in the radial direction. In addition, the fluid pressure sensor 20 can be prevented from coming out from the accommodation unit 11 to the upper side by disposing the screw member 50 so as to be opposed to the upper side of the flange portion 42. Accordingly, the fluid pressure sensor 20 can be prevented from moving in the radial direction and the up-and-down direction Z, and the fluid pressure sensor 20 can be fixed to the flow passage body 10.

In addition, the outer diameter of the male screw 52 can be made relatively large since the male screw 52 is provided in the radially outside surface of the screw member 50. Accordingly, the length of the entire circumference of the male screw 52 and the length of the entire circumference of the female screw 11d that meshes with the male screw 52 can be made relatively large, and thus an area where the male screw 52 and the female screw 11d come into contact with each other in the entire circumference in the circumferential direction can be made large. Therefore, in a case where the same fixing strength is obtained, a dimension at which the male screw 52 meshes with the female screw 11d in the up-and-down direction Z can be made small, for example, compared to a case where the male screw is provided in the radially outside surface of the sensor case.

For example, in a case where the male screw is provided in the radially outside surface of the sensor case, a stress is exerted on the sensor main body 21 when the male screw is screwed, the sensor main body 21 is distorted, and thus the detection accuracy of the fluid pressure sensor decreases in some cases. For this reason, it is necessary to provide the male screw such that the male screw is shifted away from a portion of the sensor case, in which the sensor main body 21 is accommodated. Therefore, the sensor case increases in size in the up-and-down direction Z in some cases.

On the contrary, according to the embodiment, since the male screw 52 is provided in the screw member 50, which is a member different from the sensor case 40, even if the male screw 52 is provided in a radially outside of the portion of the sensor case 40 accommodating the sensor main body 21, a stress can be prevented from being exerted on the sensor main body 21 when the male screw 52 is screwed into the female screw 11d. Therefore, the sensor case 40 can be prevented from increasing in size in the up-and-down direction Z.

As described above, according to the embodiment, since fixing strength between the male screw 52 and the female screw 11d can be sufficiently secured, the fluid pressure sensor 20 can be prevented from coming off the flow passage body 10 even in a case where a high pressure in the upward direction is exerted on the fluid pressure sensor 20 due to the pressure of a fluid from the flow passage opening 11c. In addition, the sensor mounting structure 30 can be prevented from increasing in size in the up-and-down direction Z. Therefore, the sensor mounting structure 30 which can prevent the entire fluid pressure control device 1 from increasing in size while securing the mounting strength of the fluid pressure sensor 20 can be obtained.

According to the embodiment, the flange portion 42 and the screw member 50 each have an annular shape. For this reason, the flange portion 42 is easily and stably pressed down from the upper side by the screw member 50 over the entire circumference in the circumferential direction. Accordingly, the screw member 50 can more stably fix the fluid pressure sensor 20 to the flow passage body 10.

According to the embodiment, the accommodation unit 11 has a tubular shape protruding from the upper surface of the flow passage body main body 10a in the upward direction. For this reason, the accommodation unit 11 can be provided by partially making the dimension of the flow passage body 10 in the up-and-down direction Z large. Therefore, it is easy to miniaturize, in the up-and-down direction Z, a portion of the flow passage body 10 other than a portion where the accommodation unit 11 is provided.

Modification 1 of Embodiment 1

Figure 4:
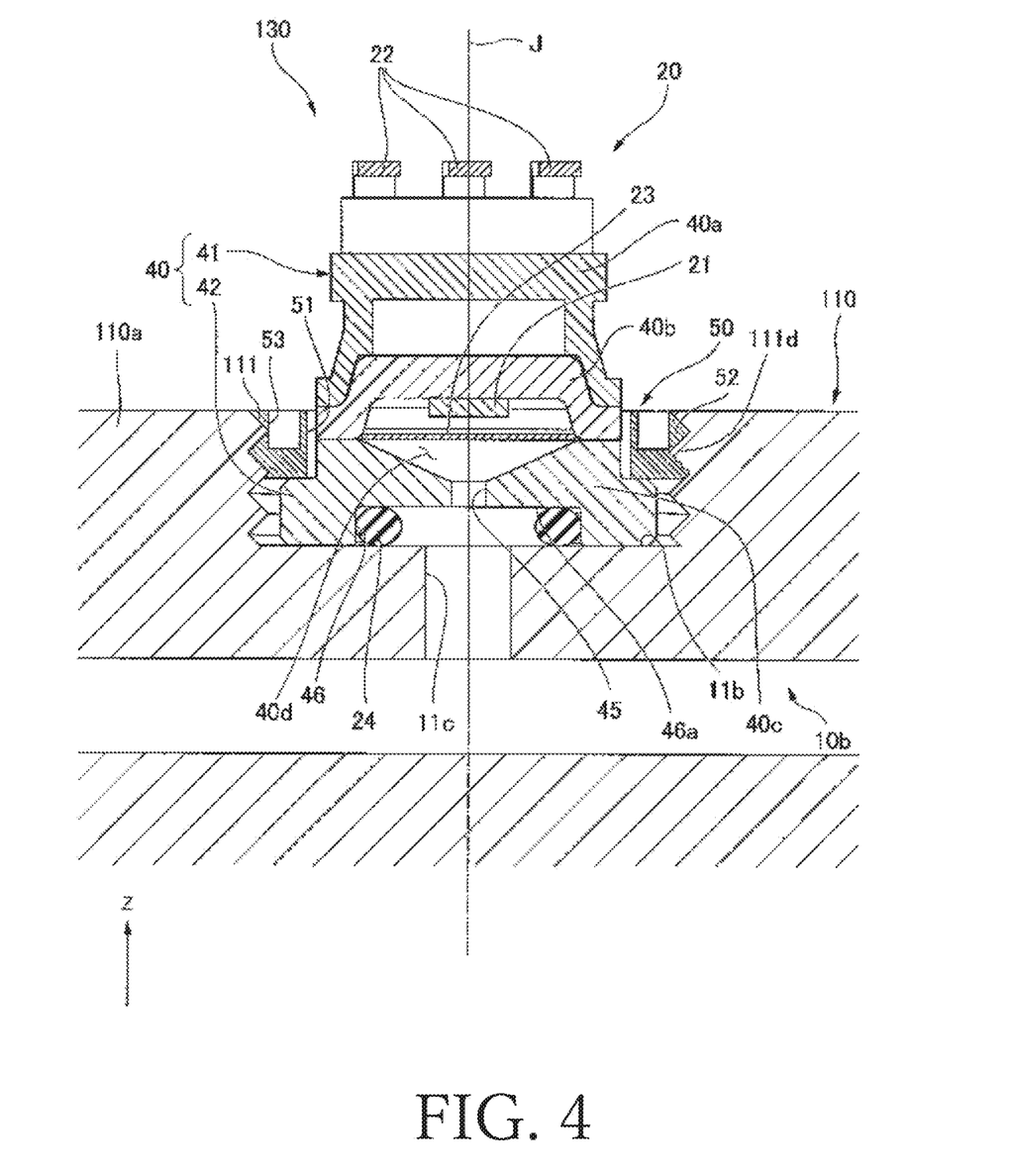
FIG. 4 is a sectional view illustrating a sensor mounting structure of Modification 1 of Embodiment 1.

As illustrated in FIG. 4, in a sensor mounting structure 130 of the modification, an accommodation unit 111 is a recessed portion of a flow passage body 110, which is recessed from an upper surface of a flow passage body main body 110a in the downward direction. A female screw 111d is provided in a radially inside surface of the accommodation unit 111. According to the modification, the accommodation unit 111 can be easily made since the accommodation unit 111 can be made for each flow passage.

Modification 2 of Embodiment 1

Figure 5:
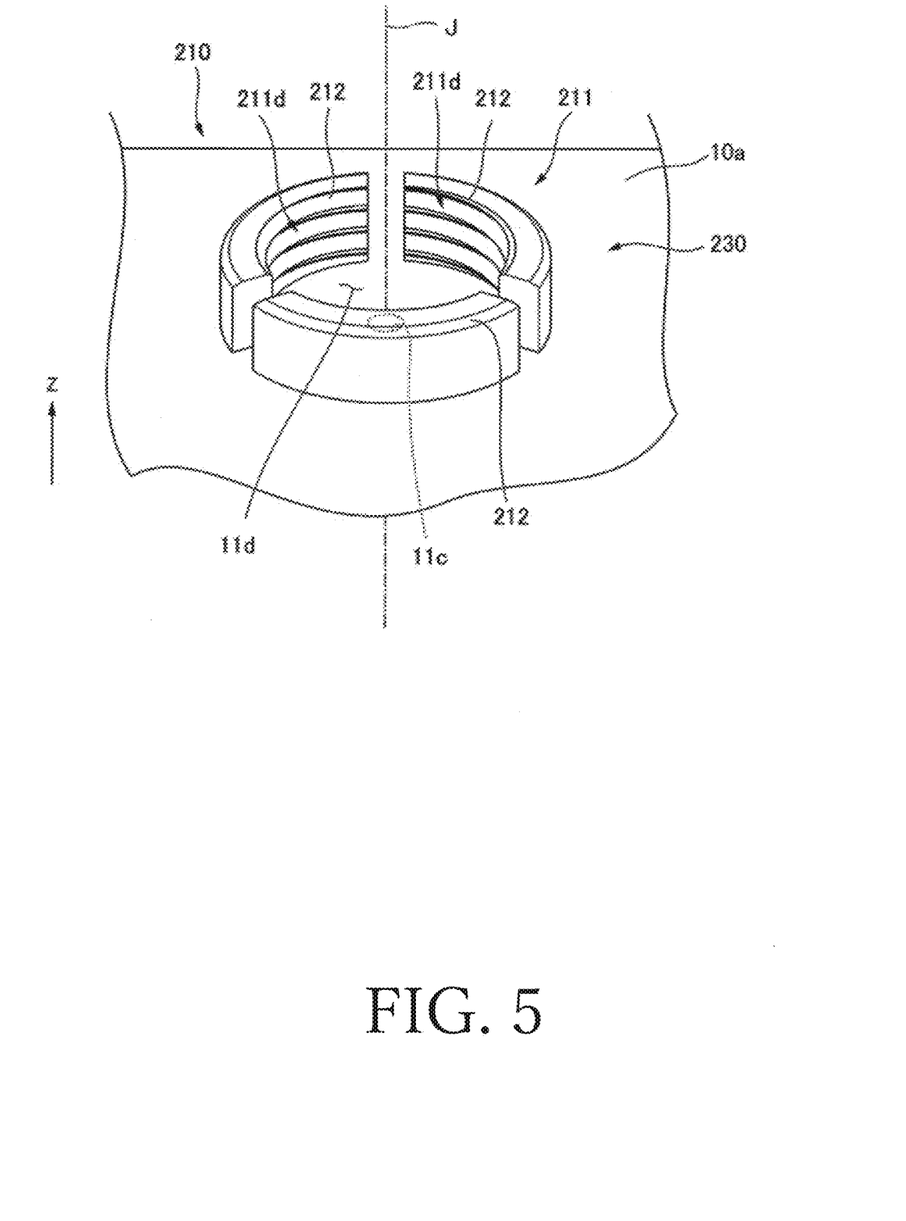
FIG. 5 is a perspective view illustrating a part of a sensor mounting structure of Modification 2 of Embodiment 1.

As illustrated in FIG. 5, in a sensor mounting structure 230 of the modification, an accommodation unit 211 is configured with a plurality of wall portions 212. The plurality of wall portions 212 protrude from the upper surface of the flow passage body main body 10a of a flow passage body 210 in the upward direction. The wall portions 212 extend in the circumferential direction. A female screw 211d is provided in a radially inside surface of each of the wall portions 212. The plurality of wall portions 212 are disposed side by side over the entire circumference in the circumferential direction of which the center is the center axis J. For example, the dimensions of the plurality of wall portions 212 in the circumferential direction are the same. Intervals between the wall portions 212 adjacent to each other in the circumferential direction are, for example, the same. In FIG. 5, for example, three wall portions 212 are provided.

According to the modification, since the accommodation unit 211 is configured with the plurality of wall portions 212, a state where a lower surface of the fluid pressure sensor 20 and the bottom surface 11b are in contact with each other can be viewed from the radially outside when the fluid pressure sensor 20 is accommodated in the accommodation unit 211. Accordingly, the fluid pressure sensor 20 can be suitably mounted on a flow passage body 210.

Description of Embodiment 2

Figure 6:
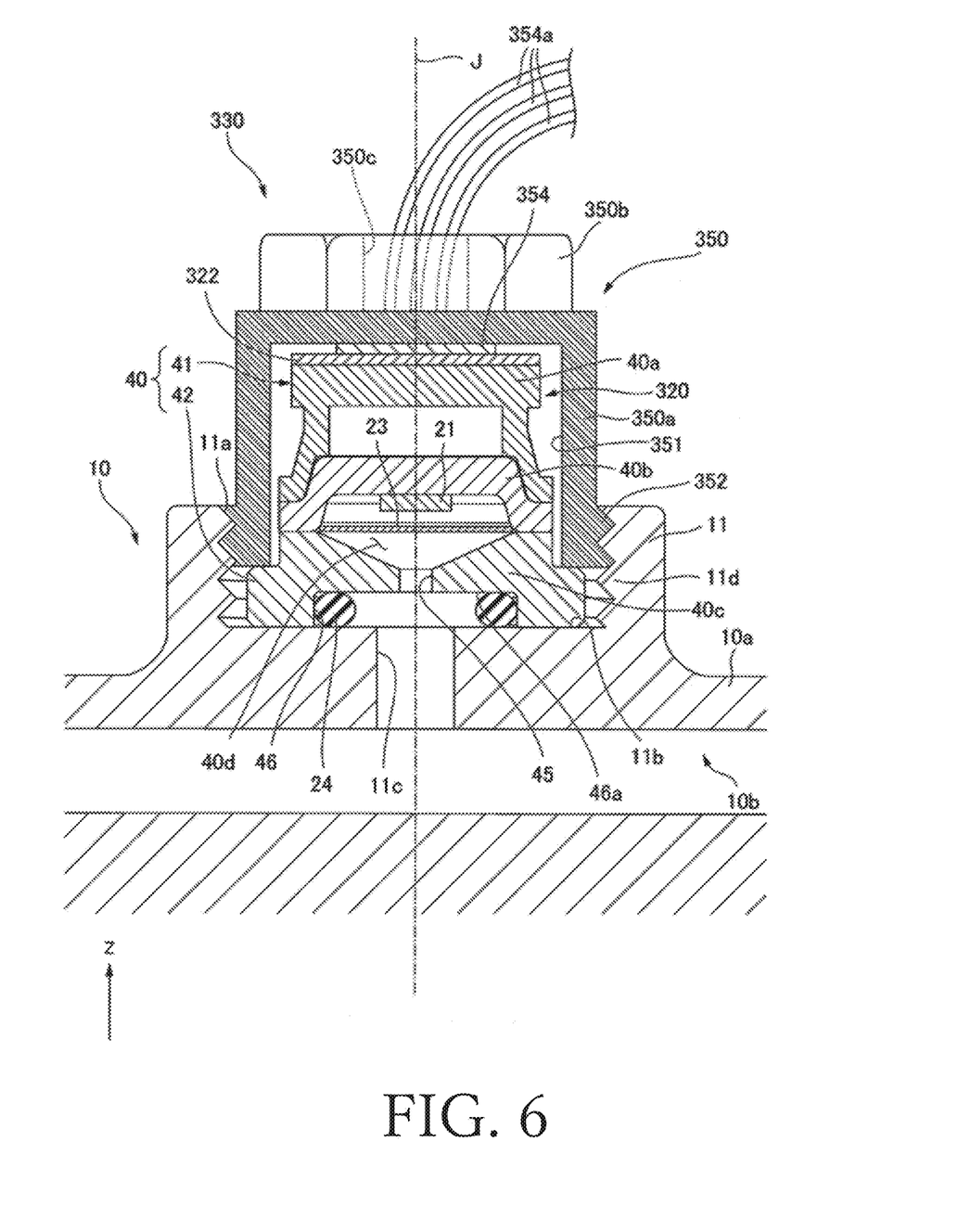
FIG. 6 is a sectional view illustrating a sensor mounting structure of Embodiment 2.

As illustrated in FIG. 6, a connection terminal 322 of a fluid pressure sensor 320 of the embodiment covers an upper surface of the columnar portion 41. In a sensor mounting structure 330 of the embodiment, a screw member 350 has a tubular shape. More specifically, the screw member 350 has a cylindrical shape of which the center is the center axis J. The screw member 350 has a screw member main body 350*a* and a screw head 350*b*. The screw member main body 350*a* has a tubular shape having a lid which opens to the lower side. The screw member main body 350*a* has a male screw 352. The male screw 352 is provided in a lower end portion of a radially outside surface of the screw member main body 350*a*. An electrode 354 is provided on a top surface facing the lower side, out of inside surfaces of the screw member main body 350*a*. Although illustration thereof is omitted, the electrode 354 is electrically connected to the connection terminal 322.

The screw head 350*b* is connected to an upper end portion of the screw member main body 350*a*. The screw head 350*b* has a prismatic shape of which the center is the center axis J. The shape of the screw head 350*b* seen from the upper side is, for example, a hexagonal shape. The screw head 350*b* is located above the accommodation unit 11. For this reason, the mounter can screw the male screw 352 of the screw member 350 into the female screw 11*d* by fitting a tool to the screw head 350*b* and rotating the tool about the center axis J. Therefore, the screw member 350 can be easily screwed into the female screw 11*d*, and the fluid pressure sensor 320 can be easily fixed to the flow passage body 10. The shape of the screw head 350*b* seen from the upper side may be a polygonal shape other than a hexagonal shape insofar as the screw head has a prismatic shape.

The screw head 350*b* has a through-hole 350*c* passing through the screw head 350*b* in the up-and-down direction Z. Wiring 354*a* passes through the through-hole 350*c*. For example, the wiring 354*a* passes through a lid of the screw member main body 350*a* and is electrically connected to the electrode 354. The wiring 354*a* is connected to a power supply (not illustrated). Accordingly, power is supplied from the power supply (not illustrated) to the sensor main body 21 via the wiring 354*a*, the electrode 354, and the connection terminal 322.

A hole portion 351 of the embodiment is configured with the inside surfaces of the screw member main body 350*a*. The hole portion 351 is recessed from a lower end portion of the screw member 350 in the upward direction. The hole portion 351 is a hole which has a bottom portion on the upper side and is open to the lower side. The upper end portion of the sensor case 40 of the embodiment is inserted into the hole portion 351. For this reason, the screw member 350 can protect the sensor case 40. In the embodiment, the screw member main body 350*a* covers the radially outside and the upper side of the sensor case 40.

The invention is not limited to the embodiments described above, and can adopt other configurations. The screw member is not particularly limited insofar as the hole portion and the male screw are included. In a lower portion of a radially inside surface of the screw member, the screw member may have a stepped portion recessed radially outward from the upper side toward the lower side. In this case, a stepped surface of the stepped portion, which faces the lower side, is disposed so as to be opposed to the upper side of the flange portion. In addition, in this case, the male screw provided in the radially outside surface of the screw member may overlap the flange portion when seen in the radial direction. In this case, the male screw may be screwed in up to the lower end portion of the radially inside surface of the accommodation unit.

A distance between a portion of the screw member, which is opposed to the flange portion in the up-and-down direction Z, and the bottom surface of the accommodation unit in the up-and-down direction Z may be larger than the dimension of the flange portion in the up-and-down direction Z. In this case, since the fluid pressure sensor receives a force to the upper side due to the pressure of a fluid, the lower surface of the sensor case is lifted from the bottom surface of the accommodation unit to the upper side, and the flange portion is pressed against the screw member from the lower side. The screw member may not come into contact with the flange portion insofar as the screw member is disposed so as to be opposed to the upper side of the flange portion. The inner diameter of the hole portion of the screw member may be almost the same as the inner diameter of the columnar portion. The radially inside surface of the hole portion may come into contact with the radially outside surface of the columnar portion.

In Embodiment 1 described above, an angularly annular screw head surrounding the columnar portion 41 may be provided on the upper end portion of the screw member 50. In this case, the mounter can easily fix the fluid pressure sensor to the flow passage body by fitting a tool to the screw head and rotating the tool about the center axis J.

The accommodation unit may accommodate the entire fluid pressure sensor. The flow passage opening may not be at a position where the center axis J passes insofar as the flow passage opening is connected to the sensing hole in the mounted state. That is, in the embodiments, the positions of the flow passage opening and the sensing hole may be shifted away from the center axis J. The sensor case may be a single member. The flange portion may not have an annular shape insofar as the flange portion protrudes from the columnar portion to the radially outside. The flange portion may not be provided on a part in the circumferential direction. In addition, a plurality of flange portions may be discretely provided in the circumferential direction.

The flow passage body that can mount the fluid pressure sensor by means of the sensor mounting structure of each embodiment described above may have a flow passage, in which a fluid flows, therein, and is not particularly limited. In addition, the fluid may be a fluid other than oil. The sensor mounting structure of the embodiments may be applied to, for example, a hydraulic sensor mounting structure with respect to an electric oil pump. Respective configurations described above can be combined as appropriate within a scope in which the configurations are not inconsistent with each other.

Features of the above-described embodiments and the modifications thereof may be combined appropriately as long as no conflict arises.

While at least an embodiment of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor mounting structure for mounting on a flow passage body including a flow passage and a flow passage opening connected to the flow passage a fluid pressure sensor including a sensor main body, the sensor mounting structure allowing the fluid pressure sensor to measure a pressure of a fluid flowing in the flow passage, the sensor mounting structure comprising:

an accommodation unit which is open to an upper side of the flow passage body and accommodates at least a part of the fluid pressure sensor therein;

a sensor case; and a screw member that fixes the sensor case to the flow passage body, wherein the sensor case covers the sensor main body, the sensor case comprises a sensing hole, which is connected to the flow passage opening exposed to an inside of the accommodation unit in a state where the fluid pressure sensor is mounted on the flow passage body, in a lower surface of the sensor case, wherein the sensor case comprises:

a columnar portion disposed along a center axis extending in an up-and-down direction, and a flange portion which protrudes from the columnar portion to a radially outer side and is accommodated in the accommodation unit, wherein the accommodation unit comprises a female screw provided in a radially inside surface of the accommodation unit, wherein the screw member comprises a hole portion which is recessed from a lower end portion of the screw member in an upward direction and into which at least a part of the columnar portion is inserted, and a male screw which is provided in a radially outside surface of the screw member and is screwed into the female screw, wherein the screw member is disposed to be opposed to an upper side of the flange portion, and wherein the screw member further includes:

a screw member main body which includes the male screw, and a prismatic screw head which is connected to an upper end portion of the screw member main body and is located above the accommodation unit.

2. The sensor mounting structure according to claim 1, wherein the hole portion passes through the screw member in the up-and-down direction, and the columnar portion passes through the hole portion and protrudes above the screw member.

3. The sensor mounting structure according to claim 2, wherein the flange portion and the screw member each have an annular shape.

4. The sensor mounting structure according to claim 1, wherein the screw member has a tubular shape, and an upper end portion of the sensor case is inserted into the hole portion.

5. The sensor mounting structure according to claim 1, wherein the flow passage body comprises a flow passage body main body, and the accommodation unit has a tubular shape protruding from an upper surface of the flow passage body main body in the upward direction.

6. The sensor mounting structure according to claim 1, wherein the flow passage body comprises a flow passage body main body, the accommodation unit is configured with a plurality of wall portions protruding from an upper surface of the flow passage body main body in the upward direction, and the plurality of wall portions are disposed side by side over an entire circumference in a circumferential direction of which a center is the center axis.

7. The sensor mounting structure according to claim 1 further comprising a seal member that seals between a portion of the upper surface of the flow passage body, which is in a vicinity of the flow passage opening, and the lower surface of the sensor case.

8. The sensor mounting structure according to claim 7, wherein the fluid pressure sensor comprises a connection terminal electrically connected to the sensor main body, and the connection terminal is disposed on an upper end portion of the sensor case and is exposed to an outside of the sensor case.

* * * * *